(12) United States Patent (10) Patent No.: US 12,385,575 B2
Kondo et al. (45) Date of Patent: Aug. 12, 2025

(54) FLUID CONTROL VALVE AND FLUID CONTROL DEVICE

(71) Applicant: HORIBA STEC, Co., Ltd., Kyoto (JP)

(72) Inventors: Noriaki Kondo, Kyoto (JP); Hideaki Miyamoto, Kyoto (JP); Naoya Tasaka, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 35 days.

(21) Appl. No.: 18/610,819

(22) Filed: Mar. 20, 2024

(65) Prior Publication Data

US 2024/0360918 A1 Oct. 31, 2024

(30) Foreign Application Priority Data

Apr. 27, 2023 (JP) ................................. 2023-073700

(51) Int. Cl.
*F16K 31/524* (2006.01)
*F16K 31/00* (2006.01)
*F16K 1/00* (2006.01)
*F16K 7/14* (2006.01)
*F16K 31/06* (2006.01)
(Continued)

(52) U.S. Cl.
CPC ...... *F16K 31/52491* (2013.01); *F16K 31/007* (2013.01); *F16K 1/00* (2013.01); *F16K 7/14* (2013.01); *F16K 31/004* (2013.01); *F16K 31/06* (2013.01); *F16K 31/44* (2013.01); *F16K 31/52* (2013.01); *F16K 37/005* (2013.01); *F16K 37/0091* (2013.01)

(58) Field of Classification Search
CPC .. F16K 31/52491; F16K 31/007; F16K 31/44; F16K 31/52; F16K 31/004; F16K 31/06; F16K 7/14; F16K 1/00; F16K 37/0091; F16K 37/005
USPC ............... 251/129.01, 157, 187; 137/529
See application file for complete search history.

(56) References Cited

U.S. PATENT DOCUMENTS 5,094,430 A * 3/1992 Shirai .................. F16K 31/007
251/86
5,281,885 A * 1/1994 Watanabe ............ F16K 31/007
251/129.01
(Continued)

FOREIGN PATENT DOCUMENTS

JP 2003199366 A 7/2003

*Primary Examiner* — Minh Q Le
(74) *Attorney, Agent, or Firm* — Alleman Hall & Tuttle LLP

(57) ABSTRACT

A fluid control valve improves position stability of a displacement expanding mechanism, and includes an actuator for driving the valve body, and the displacement expanding mechanism interposed between the valve body and the actuator to expand displacement of the actuator and transmit the displacement to the valve body. The displacement expanding mechanism includes an input member that is displaced upon receiving a driving force from the actuator, and a plurality of lever members that are disposed around a central axis of the valve body between the input member and the valve body, and expand displacement of the input member and transmit the displacement to the valve body. The plurality of lever members each have a contact surface with which the input member comes into contact to serve as a force point portion. The contact surface forms a downward gradient toward the central axis of the valve body.

10 Claims, 7 Drawing Sheets

(51) Int. Cl.
  *F16K 31/44* (2006.01)
  *F16K 31/52* (2006.01)
  *F16K 37/00* (2006.01)

(56) References Cited

U.S. PATENT DOCUMENTS

| | | | |
|---|---|---|---|
| 6,520,479 B1 * | 2/2003 | Sato | F16K 31/007 251/84 |
| 2010/0294964 A1 * | 11/2010 | Matsumoto | F16K 7/14 251/129.01 |
| 2017/0292622 A1 * | 10/2017 | Hayashi | G05D 7/0635 |
| 2018/0003312 A1 * | 1/2018 | Schupp | F16K 31/004 |
| 2018/0356845 A1 * | 12/2018 | Yasuda | F16K 31/004 |
| 2019/0353258 A1 * | 11/2019 | Kou | F15B 15/02 |
| 2020/0393051 A1 * | 12/2020 | Kondo | F16K 7/17 |
| 2021/0131587 A1 * | 5/2021 | Ransdell | F16K 37/005 |
| 2021/0199210 A1 * | 7/2021 | Hirose | H02N 2/043 |
| 2022/0057002 A1 * | 2/2022 | Shigyou | G05D 7/06 |
| 2022/0083080 A1 * | 3/2022 | Imai | G05D 7/0635 |
| 2022/0196163 A1 * | 6/2022 | Tsuchiguchi | F16K 37/00 |
| 2022/0276664 A1 * | 9/2022 | Price | G05D 7/0647 |
| 2023/0003306 A1 * | 1/2023 | Shigyou | F16K 7/14 |
| 2023/0160493 A1 * | 5/2023 | Shakudo | F16K 31/16 137/625.3 |

* cited by examiner

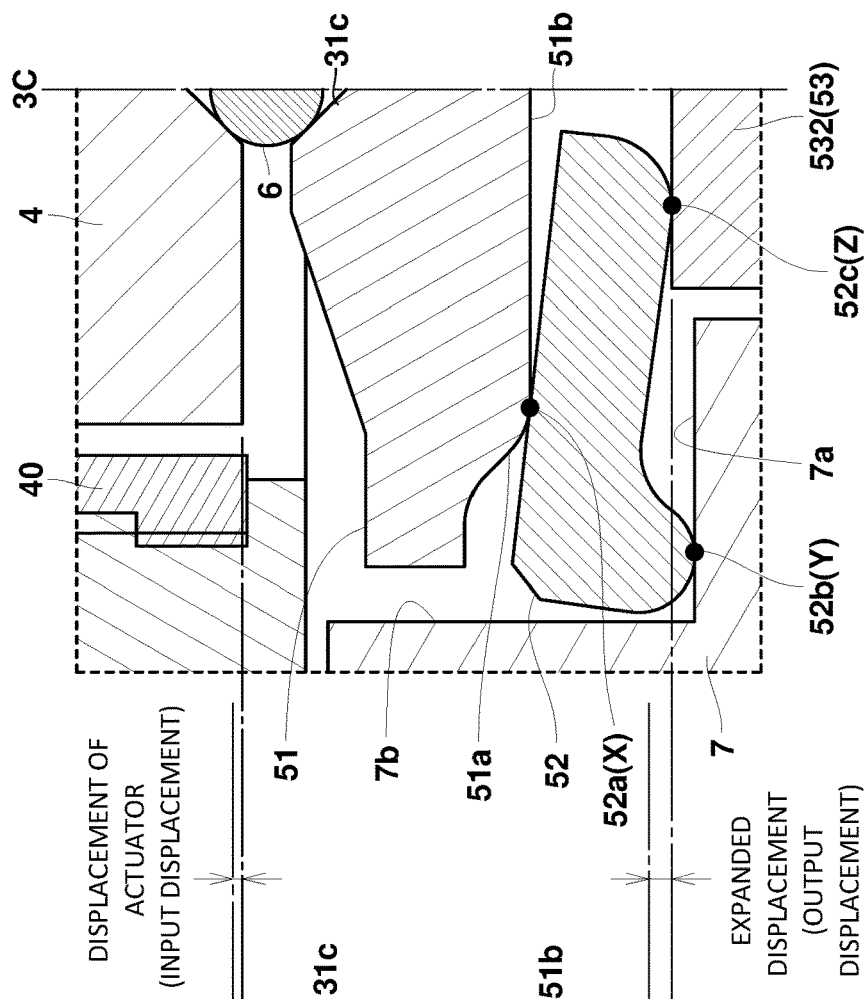
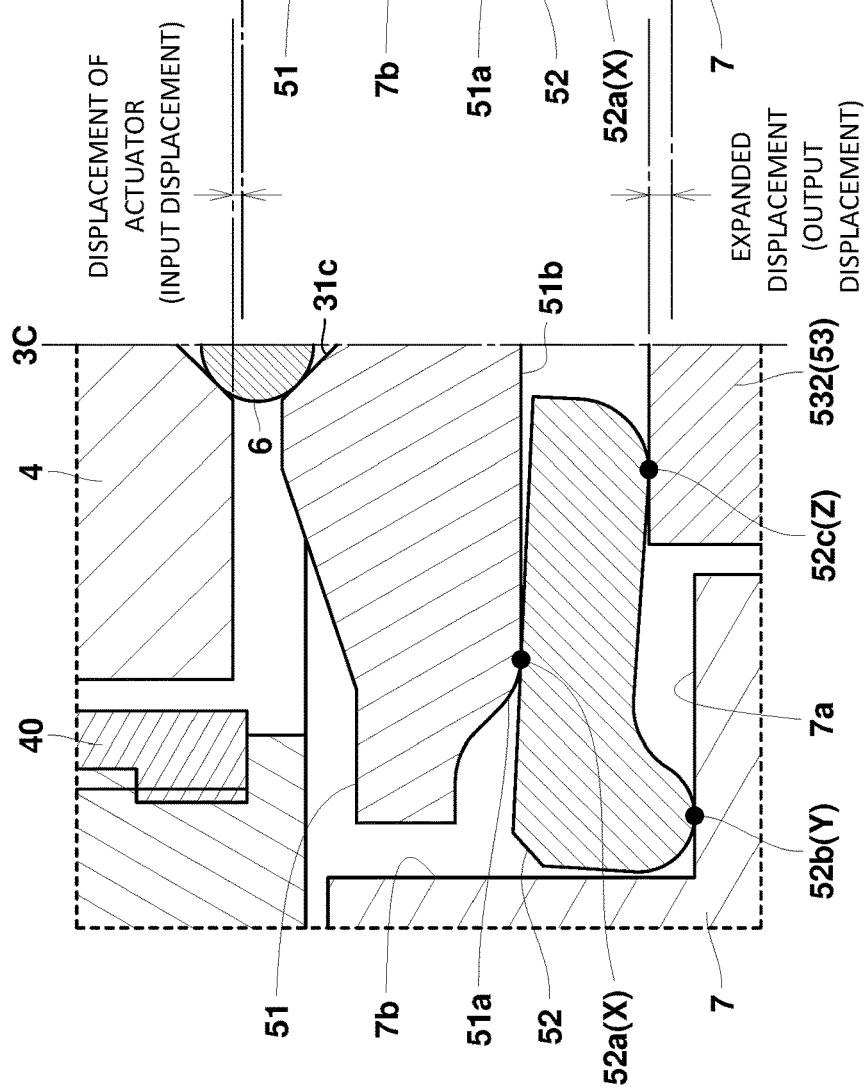

FLUID CONTROL VALVE AND FLUID CONTROL DEVICE

BACKGROUND OF THE INVENTION

1. Technical Field

The present invention relates to a fluid control valve and a fluid control device.

2. Description of the Related Art

Among conventional fluid control valves is a fluid control valve that uses a piezo stack as an actuator for driving a valve body as disclosed in Patent Document 1. This fluid control valve includes an operation amount amplification device in order to increase an operation amount (stroke) of an operation target part which is a valve body without enlarging a piezo stack having a small displacement amount.

The operation amount amplification device is provided between the piezo stack and the operation target part, and includes a pressing plate body disposed on a side of the piezo stack, a receiving plate body disposed on a side of the operation target part, and a lever body disposed so as to have a force point abutting on the pressing plate body and a working point abutting on the receiving plate body.

Here, the piezo stack has an upper end fixed to a case, and a lower end, which is a free end, displacing the pressing plate body in an up-down direction. In addition, the pressing plate body has a flat plate shape, and has a planar lower surface configured to be in contact with a convex distal end of the lever body.

However, since the lower end of the piezo stack is a free end and the lower surface of the pressing plate body is in contact with the convex distal end of the lever body, the pressing plate body coupled to the lower end of the piezo stack may be displaced in a lateral direction with respect to the lever body. As a result, there is a problem that reproducibility of a displacement amount amplified with respect to the displacement amount of the piezo stack is deteriorated.

PRIOR ART DOCUMENT

Patent Document

Patent Document 1: JP 2003-199366 A

SUMMARY OF THE INVENTION

Therefore, the present invention has been made to solve the above-described problem, and an object thereof is to improve position stability of a displacement expanding mechanism that expands displacement of a valve body.

Specifically, a fluid control valve according to the present invention includes: an actuator for driving a valve body; and a displacement expanding mechanism interposed between the valve body and the actuator to expand displacement of the actuator and transmit the displacement to the valve body, in which the displacement expanding mechanism includes: an input member that is displaced upon receiving a driving force from the actuator; and a plurality of lever members that are disposed around a central axis of the valve body between the input member and the valve body, and expand displacement of the input member and transmit the displacement to the valve body, the plurality of lever members each having a contact surface with which the input member comes into contact to serve as a force point portion, the contact surface forming a downward gradient toward the central axis of the valve body.

In this fluid control valve, the plurality of lever members disposed around the central axis of the valve body each have the contact surface that comes into contact with the input member to serve as the force point portion, and the contact surface forms a downward gradient toward the central axis of the valve body, so that the input member is less likely to be displaced in a direction away from the central axis. As a result, position stability of the displacement expanding mechanism can be improved. By improving the position stability of the displacement expanding mechanism, it is possible to improve reproducibility of a displacement amount expanded with respect to a displacement amount of the actuator. In addition, since the position stability of the displacement expanding mechanism is improved, an outflow (liquid leakage) in a fully closed state can be reduced. Furthermore, it is possible to prevent deterioration of controllability caused by exceeding of a margin at the time of full opening (a set value in a fully opened state). In addition, since the reproducibility of the displacement amount can be improved, responsiveness of fluid control can be improved.

The contact surface desirably forms a downward gradient toward the central axis of the valve body regardless of extension and contraction of the actuator.

With this configuration, the contact surface always forms a downward gradient when the input member comes into contact with the plurality of lever members, so that the input member is less likely to be displaced in position. As a result, position stability of the displacement expanding mechanism can be improved.

It is desirable that the input member includes a plurality of pressing portions that press the respective contact surfaces of the plurality of lever members, each of the pressing portions being in line contact with the corresponding contact surface.

With this configuration, since the pressing portion is brought into line contact with the contact surface, the displacement of the actuator can be reliably input to the force point portion of the lever member.

As a specific mode of each pressing portion, it is conceivable that each pressing portion is a linear projection formed to be in line contact with the corresponding contact surface.

The input member desirably has a thick portion formed on an inner side of the plurality of pressing portions and continuous with a top part of each of the pressing portions.

With this configuration, since the thick portion is provided on the inner side of the plurality of pressing portions, it is possible to improve mechanical strength of the input member and reliably input the displacement of the actuator to the force point portion of the lever member.

The displacement expanding mechanism desirably further includes an output member which is interposed between the plurality of lever members and the valve body and with which working point portions of the plurality of lever members are in contact.

With this configuration, it is not necessary to increase a size of the valve body in accordance with the plurality of lever members, and it is therefore possible to prevent an increase in a size of a peripheral member due to the increase in the size of the valve body.

The displacement expanding mechanism desirably further includes a positioning member that is provided between each of the plurality of lever members in a circumferential direction to position each of the plurality of lever members in the circumferential direction.

With this configuration, it is possible to prevent the plurality of lever members from being displaced in position, and to reliably receive a displacement input from the input member and reliably output the displacement to the valve body.

The input member desirably has a surface facing the actuator formed to have a convex shape.

With this configuration, it is possible to improve the mechanical strength of the input member and reliably input the displacement of the actuator to the force point portion of the lever member.

In a fluid control valve (piezo valve) using a piezo stack as an actuator, since a displacement amount of the piezo stack is small, a valve opening degree becomes small.

It is desirable to apply the displacement expanding mechanism of the present invention to such a fluid control valve using an actuator having a piezo stack as described above.

In addition, a fluid control device according to the present invention includes the above fluid control valve; a fluid sensor provided on an upstream side or a downstream side of the fluid control valve; and a valve control unit that controls the fluid control valve on the basis of an output of the fluid sensor.

As described above, according to the present invention, it is possible to improve position stability of a displacement expanding mechanism that expands displacement of a valve body.

BRIEF DESCRIPTION OF THE DRAWINGS

FIG. 5(a) is a schematic view illustrating a state where an actuator contracts and FIG. 5(b) is a schematic view illustrating a state where the actuator extends in the displacement expanding mechanism of the embodiment;

DETAILED DESCRIPTION

Figure 1:
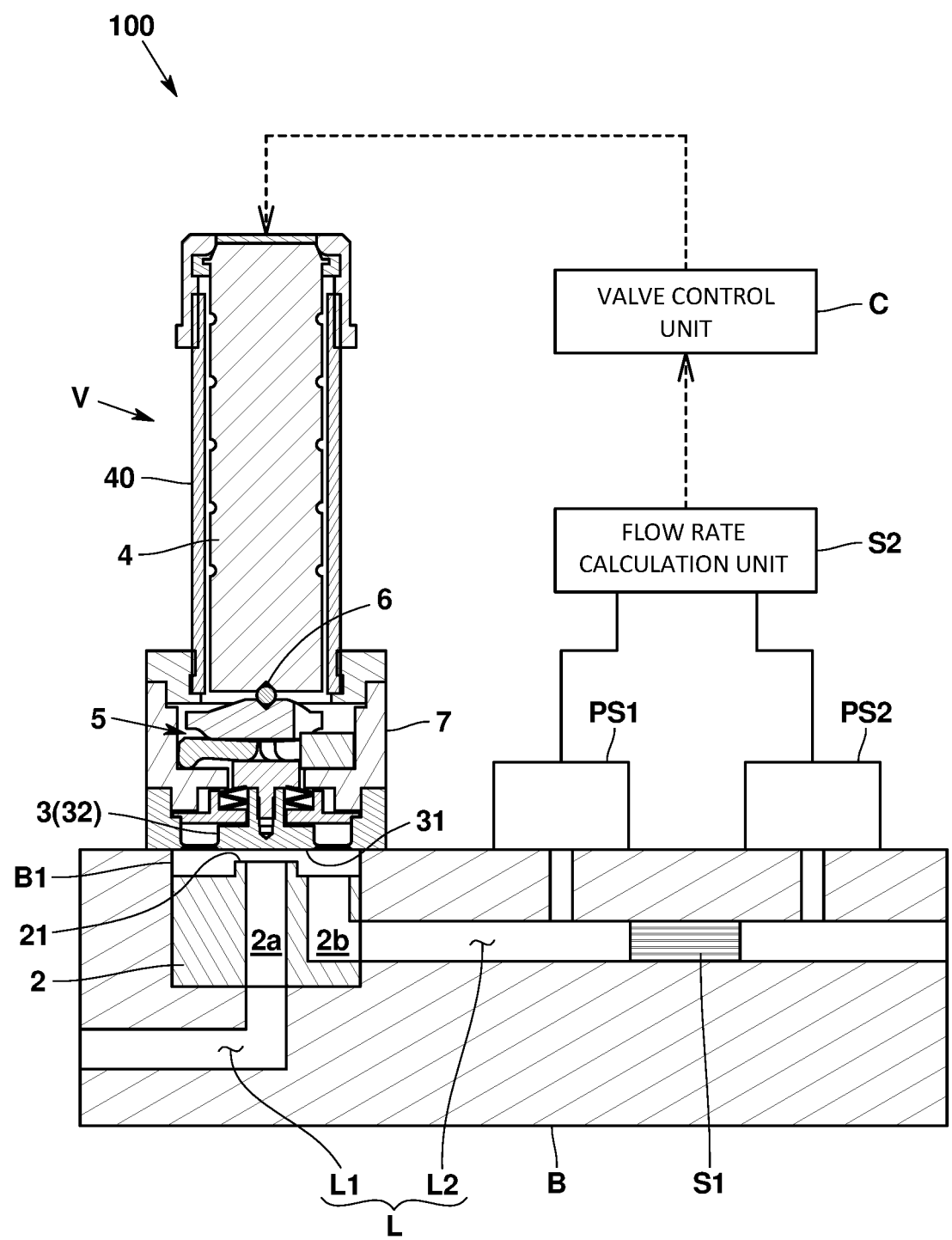
FIG. 1 is a view schematically illustrating a configuration of a fluid control device according to an embodiment of the present invention.

In the following, an embodiment of a fluid control device using a fluid control valve according to the present invention will be described with reference to the drawings. Note that any of the drawings shown below is schematically illustrated while being appropriately omitted or exaggerated for easy understanding. The same components are denoted by the same reference numerals, and description thereof will be omitted as appropriate.

1. BASIC CONFIGURATION OF FLUID CONTROL DEVICE 100

A fluid control device 100 according to the present embodiment is a so-called mass flow controller for use in a semiconductor manufacturing process. The fluid control device 100 can be used not only in a semiconductor manufacturing process but also in other processes.

As illustrated in FIG. 1, the fluid control device 100 here is of a pressure type. Specifically, the fluid control device 100 includes a flow path block B in which a flow path L is provided, a fluid control valve V installed in the flow path block B, a pair of pressure sensors PS1 and PS2 that are fluid sensors installed upstream or downstream of the fluid control valve V of the flow path block B, and a valve control unit C that performs feedback control of the fluid control valve V so that a flow rate value of the flow path L calculated on the basis of pressure values measured by the pair of pressure sensors PS1 and PS2 approaches a predetermined target value.

The flow path block B has, for example, a rectangular parallelepiped shape, and has a predetermined surface on which the fluid control valve V and the pair of pressure sensors PS1 and PS2 are installed. In addition, the flow path block B is provided with a recessed accommodation portion B1 for installing the fluid control valve V on the predetermined surface. The flow path L is divided into an upstream flow path L1 and a downstream flow path L2 by the accommodation portion B1. Then, the accommodation portion B1 has a bottom surface in which one end of the upstream flow path L1 is opened and has a side surface in which one end of the downstream flow path L2 is opened.

The paired pressure sensors PS1 and PS2 are respectively connected to an upstream side and a downstream side of a fluid resistance S1 such as a laminar flow element provided in the flow path L, and both are connected to a flow rate calculation unit S2 that calculates a flow rate on the basis of outputs of the pair of pressure sensors PS1 and PS2. The pair of pressure sensors PS1 and PS2 is attached to the predetermined surface of the flow path block B in line with the fluid control valve V.

The valve control unit C has a so-called computer including a CPU, a memory, an A/D-D/A converter, and the like, in which a program stored in the memory is executed, and various apparatuses cooperate to implement each function. Specifically, a valve opening degree of the fluid control valve V is feedback-controlled so that a flow rate value calculated by the flow rate calculation unit S2 approaches a target value stored in advance in the memory.

2. SPECIFIC CONFIGURATION OF FLUID CONTROL VALVE V

Next, the fluid control valve V of the present embodiment will be described. In the following description, for convenience of explanation, a valve seat member 2 side is defined as a lower side with respect to a valve body 3, and an actuator 4 side is defined as an upper side with respect to the valve body 3.

Figure 2:
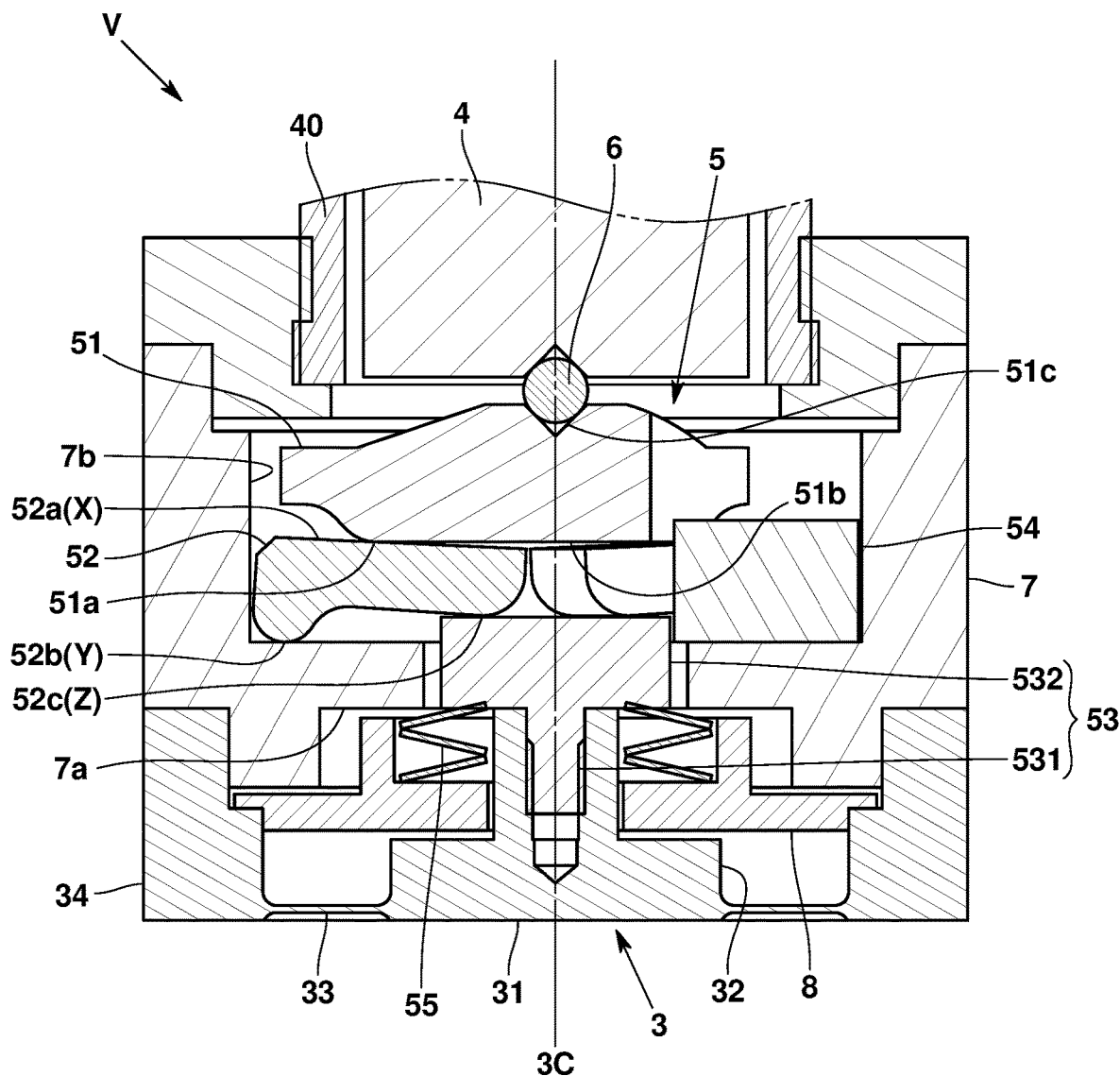
FIG. 2 is an enlarged cross-sectional view of the fluid control valve of the embodiment.

The fluid control valve V of the present embodiment is, for example, a normally open type, and includes the valve seat member 2 in which a valve seat 21 is formed, the valve body 3 provided so as to be able to come into and out of contact with the valve seat 21, and the actuator 4 for driving the valve body 3 as illustrated in FIGS. 1 and 2.

The valve seat member 2 has the valve seat 21 for partitioning the upstream flow path L1 and the downstream flow path L2, and is accommodated in the accommodation portion B1 of the flow path block B. The valve seat member 2 of the present embodiment has the annular valve seat 21. Then, a first internal flow path 2a communicating with the upstream flow path L1 is formed inside the valve seat 21. A second internal flow path 2b communicating with the downstream flow path L2 is formed outside the valve seat 21.

The valve body 3 has a seating surface 31 seated on the valve seat 21 of the valve seat member 2. As illustrated in FIG. 2, the valve body 3 of the present embodiment includes a substantially columnar valve body main body portion 32 extending in an advancing and retracting direction by the actuator 4, and a substantially disk-shaped diaphragm portion 33 provided around the valve body main body portion 32. The valve body main body portion 32 has a lower surface serving as the seating surface 31. The diaphragm portion 33 has an outer periphery connected to a substantially cylindrical support portion 34. The support portion 34 is fixed to the flow path block B via a seal member (not illustrated). In the present embodiment, the valve body main body portion 32, the diaphragm portion 33, and the support portion 34 are integrally formed.

The actuator 4 is a piezo actuator, and has one or a plurality of piezo stacks in which piezoelectric ceramic layers and electrode layers are alternately stacked. In addition, the actuator 4 is accommodated in a casing 40, and in the casing 40, an upper end (an end opposite to the valve body 3 side) of the actuator 4 is fixed to the casing 40. In other words, when the actuator 4 extends or contracts, a lower end (an end on the valve body 3 side) of the actuator 4 is displaced. When the lower end of the actuator 4 is displaced, the valve body 3 moves via a displacement expanding mechanism 5 to be described later.

With the above configuration, when the actuator 4 extends, the seating surface 31 of the valve body 3 comes into contact with the valve seat 21 of the valve seat member 2 to block the upstream flow path L1 and the downstream flow path L2. When the actuator 4 contracts, the seating surface 31 of the valve body 3 is separated from the valve seat 21 of the valve seat member 2 to cause the upstream flow path L1 and the downstream flow path L2 to communicate with each other. Then, a position of the valve body 3 changes according to the extension and contraction of the actuator 4, and as a result, a distance between the valve seat 21 and the seating surface 31 changes to control the flow rate.

<Displacement Expanding Mechanism 5>

Thus, as illustrated in FIGS. 2 to 5, the fluid control valve V of the present embodiment includes the displacement expanding mechanism 5 that expands displacement of the actuator 4 and transmits the expanded displacement to the valve body 3.

As illustrated in FIGS. 2 to 5, the displacement expanding mechanism 5 has an input member 51 that is displaced upon receiving a driving force from the actuator 4, a plurality of lever members 52 that expand displacement of the input member 51 and transmit the expanded displacement to the valve body 3, and an output member 53 that is displaced upon receiving a driving force from the plurality of lever members 52.

The input member 51 is coupled to a lower end which is a free end of the actuator 4 via an intermediate coupling body 6. In addition, the input member 51 has an upper surface, which is a surface facing the actuator 4, having a convex shape, and has a central portion in which a recess 51c is formed where the intermediate coupling body 6 is provided. Then, when the actuator 4 extends or contracts, the input member 51 is displaced together with the actuator 4 via the intermediate coupling body 6. The input member 51 is displaced together with the actuator 4 to input a driving force (the displacement of the actuator 4) to the plurality of lever members 52. The input member 51 is accommodated in an accommodation block 7 connected to the support portion 34 of the valve body 3 (see FIG. 2).

The plurality of lever members 52 are disposed around a central axis 3C of the valve body 3 between the input member 51 and the valve body 3. Specifically, the central axis 3C of the valve body 3 is a central axis of the valve body main body portion 32 and also a central axis of the actuator 4. The plurality of lever members 52 of the present embodiment are disposed at equal intervals in a circumferential direction around the central axis 3C of the valve body 3. Although there is here shown an example in which three lever members 52 are disposed, a configuration using one or two lever members 52 or a configuration using four or more lever members 52 may be adopted.

Specifically, the plurality of lever members 52 are accommodated in the accommodation block 7 (see FIG. 2). Inside the accommodation block 7, a substantially columnar space for accommodating the input member 51 and the plurality of lever members 52 is formed (see FIGS. 2 and 4). Then, the plurality of lever members 52 are disposed at equal intervals in the circumferential direction on, for example, an upper surface (surface facing the actuator 4 side) of an annular protrusion 7a formed inside the accommodation block 7. In addition, the plurality of lever members 52 come into contact with an inner peripheral surface 7b of the accommodation block 7 to have positions thereof regulated in a radial direction.

As illustrated in FIG. 2, each lever member 52 has a contact surface 52a with which the input member 51 comes into contact to become a force point portion X. Specifically, the input member 51 has the contact surface 52a which comes into contact with an upper surface (a surface facing the actuator 4) of each of the lever members 52 to become the force point portion X. Furthermore, the respective lever members 52 have the same shape.

In addition, a projection 52b serving as a fulcrum portion Y is formed on an outer side of a lower surface (a surface facing the valve body 3 side) of each lever member 52, and a distal end 52c serving as a working point portion Z is formed on an inner side of the lower surface. The outer side of the lower surface is a side away from the central axis 3C of the valve body 3, and the inner side of the lower surface is a side toward the central axis 3C of the valve body 3.

Here, as illustrated in FIGS. 5(a) and 5(b), positions of the fulcrum portion Y, the force point portion X, and the working point portion Z are set in each of the lever members 52 in order to expand the displacement input from the input member 51 and output the expanded displacement to the output member 53. Specifically, a distance between the fulcrum portion Y and the working point portion Z is set to be larger than a distance between the fulcrum portion Y and the force point portion X.

As illustrated in FIGS. 2 and 5, the contact surface 52a of each lever member 52 forms a downward gradient toward the central axis 3C of the valve body 3. Here, "forms a downward gradient toward the central axis 3C" means that the contact surface 52a is inclined toward the valve body side (the side opposite to the actuator 4) as it goes toward the central axis 3C. The contact surface 52a forms a downward gradient toward the central axis 3C of the valve body 3 regardless of extension and contraction of the actuator 4. In a state where the plurality of lever members 52 are disposed on the protrusion 7a of the accommodation block 7, the contact surface forms a downward gradient toward the central axis 3C of the valve body 3. Although the contact surface 52a of the present embodiment is a flat surface, it may be a curved surface or a bent surface. An inclination angle of the downward gradient of the contact surface 52a is larger than 0 degrees and is, for example, 20 degrees or less with respect to a horizontal plane (a plane orthogonal to the central axis 3C) in a state before the actuator 4 extends.

Figure 3:
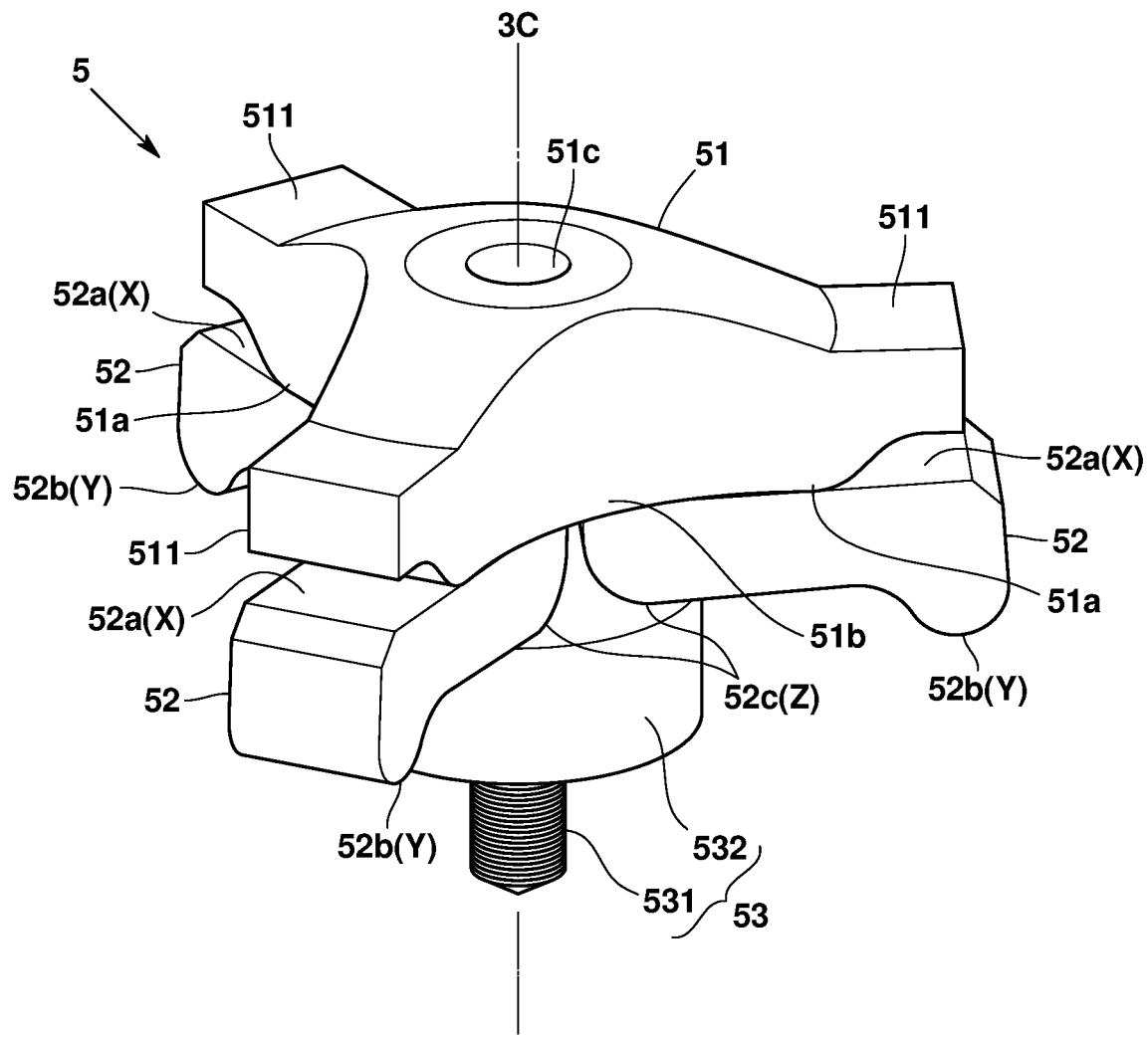
FIG. 3 is a perspective view illustrating a displacement expanding mechanism of the embodiment.

The input member 51 inputs the displacement of the actuator 4 to the plurality of lever members 52. As illustrated in FIGS. 2, 3, and 5, the input member 51 of the present embodiment has a plurality of pressing portions 51a that press the respective contact surfaces 52a of the plurality of lever members 52. Specifically, as illustrated in FIG. 3, the input member 51 has a plurality of branch portions 511 in which the respective pressing portions 51a are formed. In other words, the input member 51 is provided with the plurality of branch portions 511 formed so as to correspond to the plurality of lever members 52.

Each pressing portion 51a is in line contact with the corresponding contact surface 52a. Here, the line contact means that the pressing portion 51a is in linear contact with the contact surface 52a over a predetermined range. In addition, each pressing portion 51a is a linear projection formed to be in line contact with the corresponding contact surface 52a. Since the pressing portion 51a is in line contact with the contact surface 52a in this manner, stress concentration can be reduced and wear or the like of the contact surface 52a can be reduced as compared with a case of point contact.

In addition, the input member 51 has a thick portion 51b formed on an inner side of the plurality of pressing portions 51a and continuous with a top part of each of the pressing portions 51a. A lower surface of the thick portion 51b, which is a surface facing the lever member 52, is a flat surface. The thick portion 51b enhances mechanical strength of the input member 51.

Here, positioning members 54 each positioning each of the plurality of lever members 52 in the circumferential direction are provided between the respective lever members 52 in the circumferential direction. The circumferential direction is a direction around the central axis 3C of the valve body 3.

Figure 4:
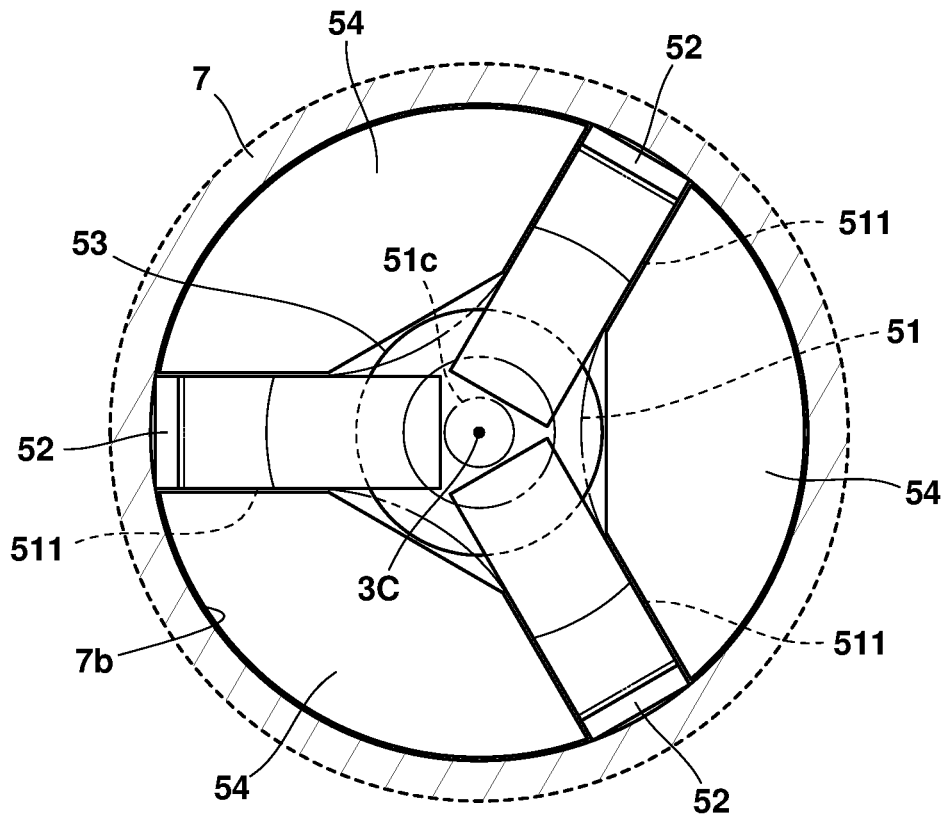
FIG. 4 is a schematic view illustrating a positional relationship between a lever member and a positioning member according to the embodiment.

As illustrated in FIGS. 2 and 4, the positioning members 54 are disposed between the plurality of lever members 52 disposed apart from each other in the circumferential direction. The positioning members 54 are disposed with slight rattling on the lever members 52 adjacent to each other so that the respective lever members 52 can rotate about the fulcrum portions. The positioning member 54 positions the input member 51 with respect to the plurality of lever members 52. Therefore, the positioning member 54 is also disposed between the branch portions 511 of the input member 51.

As illustrated in FIGS. 2 to 5, the output member 53 comes into contact with the distal ends 52c serving as the working point portions Z of the plurality of lever members 52 to transmit a driving force received from the working point portions Z to the valve body main body portion 32 of the valve body 3. The output member 53 is connected to an upper end of the valve body main body portion 32 of the valve body 3, the upper end being an end on a side opposite to the seating surface 31. The output member 53 of the present embodiment is screwed and connected to the valve body main body portion 32, and has a male screw portion 531 screwed to a female screw portion formed in the valve body main body portion 32, and a receiving portion 532 provided at an upper end of the male screw portion 531. The receiving portion 532 has an upper surface in contact with the working point portions Z of the plurality of lever members 52, and has a substantially disk shape. The receiving portion 532 of the output member 53 can receive a force from the plurality of lever members 52 without increasing a radial size of the valve body main body portion 32.

Furthermore, the output member 53 is energized in a direction (opening direction) in which the valve body 3 is opened by an elastic body 55. As a specific configuration, as illustrated in FIG. 2, the output member 53 is energized in an opening direction by provision of the elastic body 55 between a support ring 8 provided in the support portion 34 and the output member 53. When the output member 53 is energized in the opening direction, the valve body main body portion 32 of the valve body 3 is also energized in the opening direction. The support ring 8 has a through hole at the center, and the valve body main body portion 32 moves inside the through hole. Furthermore, the elastic body 55 is configured by, for example, a leaf spring. Since the elastic body 55 is configured by a leaf spring, an installation space thereof can be reduced as compared with a case where a spring is used.

In the above configuration, in a state where the fluid control valve V is assembled, the output member 53, the plurality of lever members 52, the input member 51, and the intermediate coupling body 6 are pressed against the lower end of the actuator 4 by an elastic force of the diaphragm portion 33 and an elastic force of the elastic body 55. In other words, in the state where the fluid control valve V is assembled, the input member 51 and the plurality of lever members 52 are in pressing contact with each other. In this state, the contact surface 52a of each lever member 52 forms a downward gradient toward the central axis 3C of the valve body 3 (see FIG. 2). In addition, each lever member 52 is in contact with the inner peripheral surface 7b of the accommodation block 7 to have a position regulated.

<Operation of Fluid Control Valve V>

Next, operation of the fluid control valve V according to the present embodiment will be described.

The fluid control valve V is set such that the valve opening degree (the distance between the valve seat 21 of the valve seat member 2 and the seating surface 31 of the valve body 3) becomes a predetermined value in a state where no voltage is applied to the actuator 4. The state in which the valve opening degree reaches the predetermined value is a fully opened state of the fluid control valve V.

Next, when a voltage is applied to the actuator 4, the actuator 4 extends. Then, a driving force accompanying the extension of the actuator 4 is transmitted to the valve body main body portion 32 of the valve body 3 via the displacement expanding mechanism 5, and the valve body main body portion 32 moves in a direction in which it comes into contact with the valve seat 21 (approaching direction). As a result, the valve opening degree becomes a value smaller than the predetermined value. Since the actuator 4 increases its extension as an applied voltage value increases, the valve opening degree can be controlled by adjusting a magnitude of the voltage value.

Here, as illustrated in FIGS. 5(a) and 5(b), the displacement due to the extension of the actuator 4 is expanded at a predetermined magnification by the displacement expanding mechanism 5 and transmitted to the valve body main body portion 32 of the valve body 3.

Specifically, when the actuator 4 extends, the input member 51 is displaced in a direction in which it comes into contact with the valve seat 21 (approaching direction) via the intermediate coupling body 6. When the input member 51 is displaced in the direction of coming into contact with the valve seat 21, each pressing portion 51a of the input member 51 presses the contact surface 52a which is the force point portion X of each lever member 52.

Here, since the contact surface 52a of each lever member 52 forms a downward gradient toward the central axis 3C of the valve body 3, positional displacement of the input member 51 in a direction away from the central axis 3C is eliminated. Since each lever members 52 is in contact with the inner peripheral surface 7b of the accommodation block 7, each lever members 52 is not displaced outward.

As illustrated in FIGS. 5(a) and 5(b), when the contact surface 52a, which is the force point portion X, of each lever members 52 is pressed, each lever member 52 rotates about the projection 52b, which becomes the fulcrum portion Y, as a rotation center, and the distal end 52c, which is the working point portion Z, presses the output member 53 in a direction in which the output member comes into contact with the valve seat 21. As a result, the output member 53 moves in the direction of contacting the valve seat 21 (approaching direction). With the plurality of lever members 52, displacement of the output member 53 is expanded at a predetermined magnification with respect to the displacement of the input member 51. As a result, the displacement of the actuator 4 is expanded and transmitted to the valve body main body portion 32 of the valve body 3. When the voltage applied to the actuator 4 becomes a predetermined value or more, the valve seat 21 of the valve seat member 2 and the seating surface 31 of the valve body 3 come into contact with each other.

Subsequently, when the voltage applied to the actuator 4 decreases, the actuator 4 contracts. Then, as the actuator 4 contracts, the valve body main body portion 32 of the valve body 3 moves in a direction away from the valve seat 21 (separating direction) by the pressing of the elastic body 55. As a result, the valve opening degree has a large value.

3. EFFECTS OF THE PRESENT EMBODIMENT

As described above, according to the fluid control device 100 of the present embodiment, the plurality of lever members 52 disposed around the central axis 3C of the valve body 3 have the contact surfaces 52a that come into contact with the input member 51 to become the force point portion X, and the contact surface 52a forms a downward gradient toward the central axis 3C of the valve body 3, so that the input member 51 is less likely to be displaced in the direction away from the central axis 3C. As a result, position stability of the displacement expanding mechanism 5 can be improved. Improvement of the position stability of the displacement expanding mechanism 5 leads to improvement of reproducibility of a displacement amount expanded with respect to a displacement amount of the actuator 4. Improvement of the position stability of the displacement expanding mechanism 5 also leads to reduction of an outflow (liquid leakage) in a fully closed state. Furthermore, it is possible to prevent deterioration of controllability caused by exceeding of a margin at the time of full opening (a set value in a fully opened state). In addition, since the reproducibility of the displacement amount can be improved, responsiveness of fluid control can be improved.

4. OTHER EMBODIMENTS

For example, the input member 51 may have, for example, a disk shape instead of the configuration having the plurality of branch portions 511. In this case, the plurality of pressing portions 51a corresponding to the plurality of lever members 52 are formed on a lower surface of the input member 51.

In addition, the lever member 52 having the projection 52b serving as the fulcrum portion Y may not have the projection 52b. In this case, it is conceivable that a convex is formed on the upper surface of the protrusion 7a of the accommodation block 7 so that the lever member 52 is rotatable via the fulcrum portion Y in contact with the convex.

Furthermore, although the contact surface 52a of the lever member 52 of the above-described embodiment is formed on substantially the entire upper surface of the lever member 52, the contact surface may be formed in a region where the pressing portion 51a of the input member 51 is allowed to come into contact with the contact surface. Here, the region where the pressing portion 51a of the input member 51 is allowed to come into contact with the contact surface is a range from a part where the pressing portion 51a comes into contact with the contact surface in a state where the actuator 4 contracts to a part where the pressing portion 51a comes into contact with the contact surface in a state where the actuator 4 extends, and includes a part where the pressing portion 51a comes into contact with the contact surface even when the input member 51 is displaced in a lateral direction.

Figure 6:
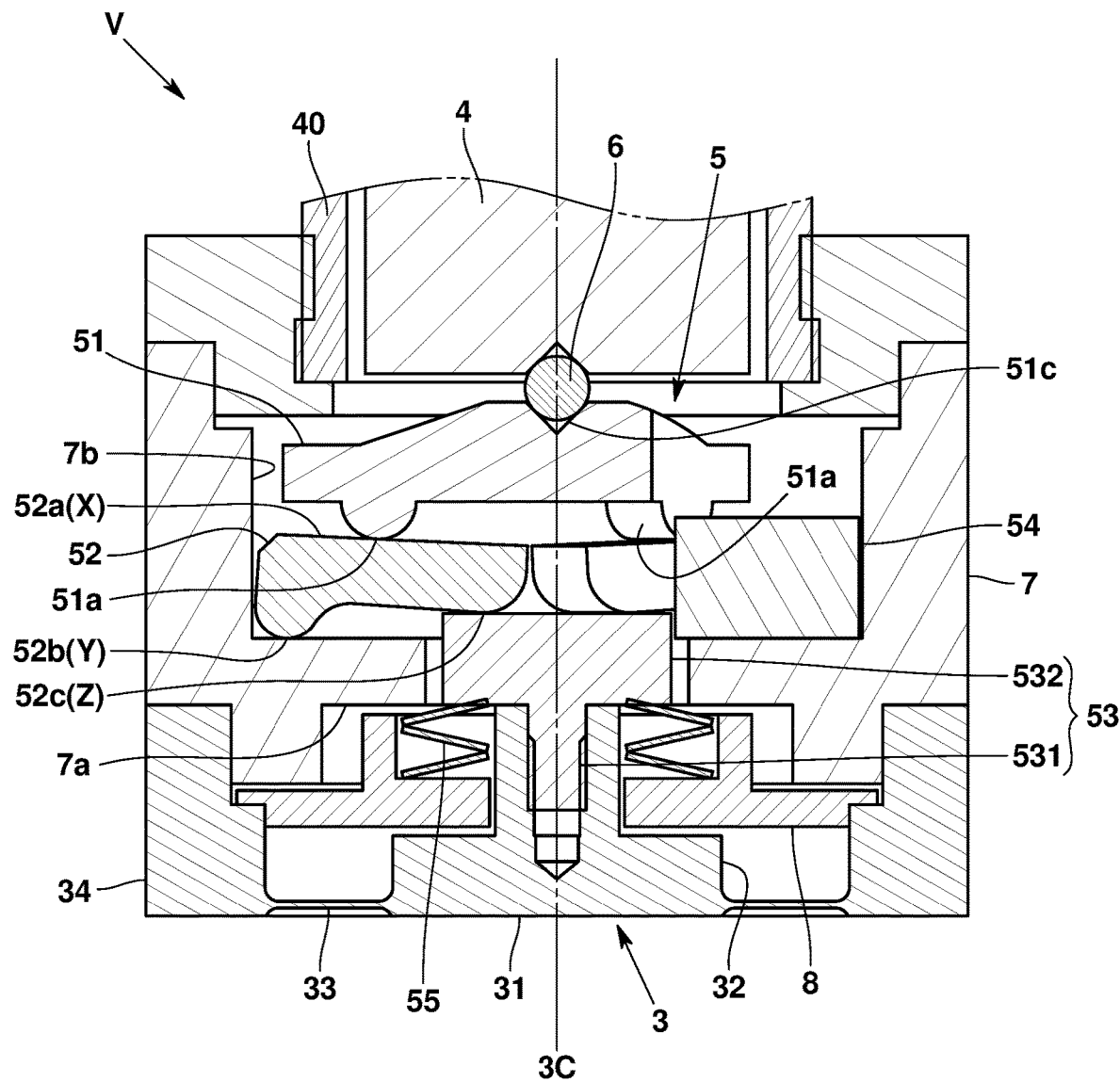
FIG. 6 is an enlarged cross-sectional view of a fluid control valve of a modified embodiment.

In addition, the input member 51 having the thick portion 51b in the above embodiment may not have the thick portion 51b as illustrated in FIG. 6. In this case, the input member 51 has the pressing portion 51a protruding downward.

Figure 7:
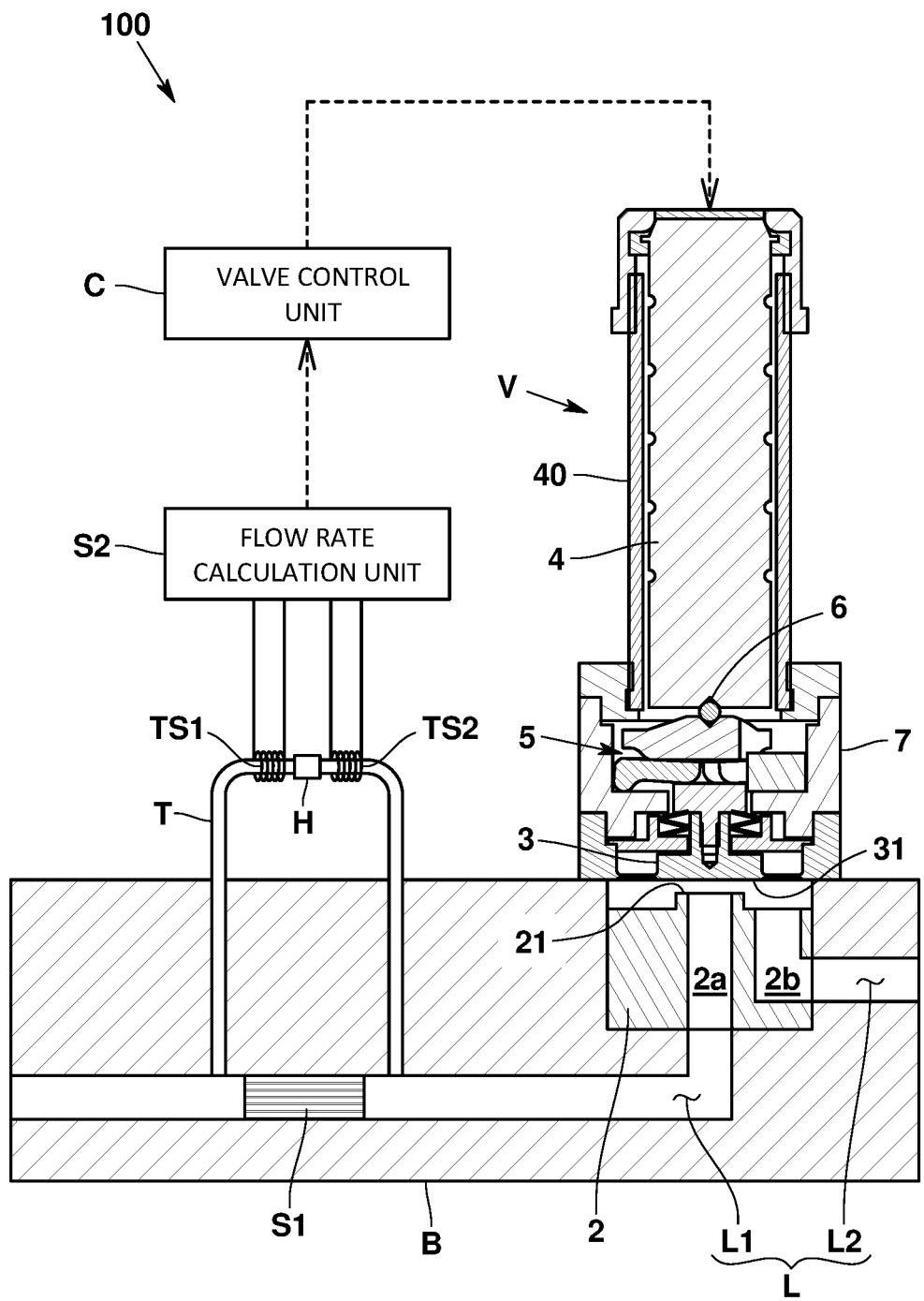
FIG. 7 is a view schematically illustrating a configuration of a fluid control device according to the modified embodiment.

Moreover, although in the above embodiment, the fluid control device 100 has been described as a differential pressure type fluid control device, the device may be a thermal type fluid control device as illustrated in FIG. 7. Specifically, such fluid control device is provided with a narrow tube T connected in parallel with the flow path L such that a predetermined ratio of fluid is guided by the fluid resistance S1 among fluid flowing through the flow path L, a heater H provided at the narrow tube T, and a pair of temperature sensors TS1 and TS2 which are fluid sensors provided before and after the heater H. Then, since when the fluid flows through the narrow tube T, a temperature difference corresponding to a mass flow rate is generated between the two temperature sensors TS1 and TS2, the flow rate is measured on the basis of the temperature difference.

Although in the above embodiment, the present invention has been described while exemplifying the normally open type fluid control valve V, the present invention is also applicable to a normally closed type fluid control valve.

Although in the above embodiment, a piezo element (piezo stack) is used as the actuator 4 of the fluid control valve V, a solenoid or the like may be used.

In addition, various modifications and combinations of embodiments may be made without departing from the gist of the present invention.

REFERENCE CHARACTER LIST 100 fluid control device
V fluid control valve
PS1, PS2 pressure sensor (fluid sensor)
C valve control unit
3 valve body
3C central axis of valve body
4 actuator
5 displacement expanding mechanism
51 input member
51a plurality of pressing portions 51*b* thick portion
52 plurality of lever members
X force point portion
Y fulcrum portion
Z working point portion
52*a* contact surface
53 output member
54 positioning member

What is claimed is:

1. A fluid control valve comprising:
an actuator for driving a valve body; and
a displacement expanding mechanism interposed between the valve body and the actuator to expand displacement of the actuator and transmit the displacement to the valve body, wherein
the displacement expanding mechanism includes:
an input member that is displaced upon receiving a driving force from the actuator; and
a plurality of lever members that are disposed around a central axis of the valve body between the input member and the valve body, and expand displacement of the input member and transmit the displacement to the valve body,
the plurality of lever members each having a contact surface with which the input member comes into contact to serve as a force point portion, and
the contact surface forming a downward gradient toward the central axis of the valve body.

2. The fluid control valve according to claim 1, wherein the contact surface forms a downward gradient toward the central axis of the valve body regardless of extension and contraction of the actuator.

3. The fluid control valve according to claim 1, wherein the input member includes a plurality of pressing portions that press the respective contact surfaces of the plurality of lever members, each of the pressing portions being in line contact with the corresponding contact surface.

4. The fluid control valve according to claim 3, wherein each of the pressing portions is a linear projection formed to be in line contact with the corresponding contact surface.

5. The fluid control valve according to claim 3, wherein the input member has a thick portion formed on an inner side of the plurality of pressing portions and continuous with a top part of each of the pressing portions.

6. The fluid control valve according to claim 1, wherein the displacement expanding mechanism further includes an output member which is interposed between the plurality of lever members and the valve body and with which working point portions of the plurality of lever members are in contact.

7. The fluid control valve according to claim 1, wherein the displacement expanding mechanism further includes a positioning member that is provided between each of the plurality of lever members in a circumferential direction to position each of the plurality of lever members in the circumferential direction.

8. The fluid control valve according to claim 1, wherein the input member has a surface facing the actuator formed to have a convex shape.

9. The fluid control valve of claim 1, wherein the actuator has a piezo stack.

10. A fluid control device comprising:
the fluid control valve according to claim 1;
a fluid sensor provided on an upstream side or a downstream side of the fluid control valve; and
a valve control unit that controls the fluid control valve on the basis of an output of the fluid sensor.

* * * * *